H. A. WIEMAN.
VEHICLE BODY.
APPLICATION FILED NOV. 1, 1919.
1,372,854.
Patented Mar. 29, 1921.
2 SHEETS—SHEET 1.
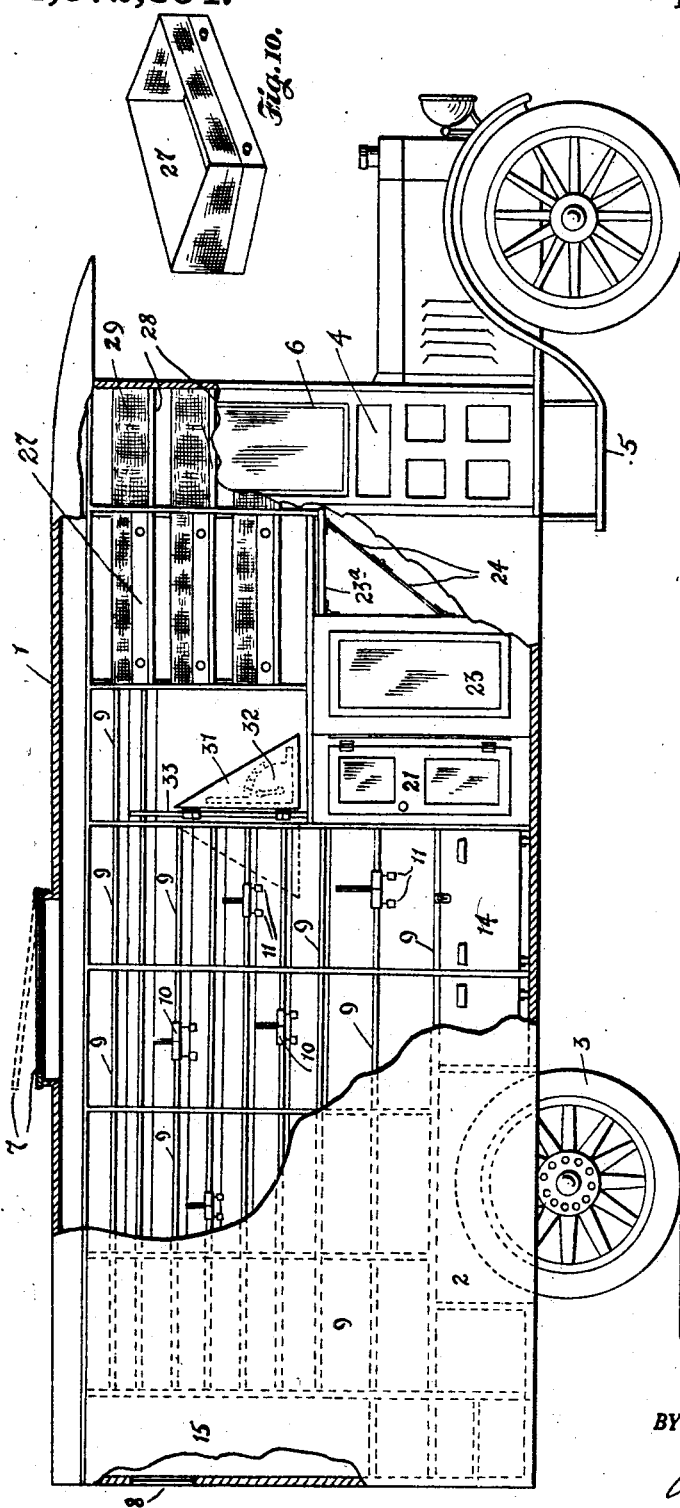
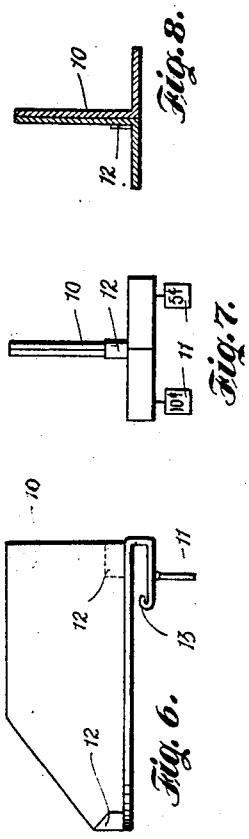
INVENTOR.
Herman A. Wieman
BY John M. Spellman
ATTORNEYS.

H. A. WIEMAN.
VEHICLE BODY.
APPLICATION FILED NOV. 1, 1919.
1,372,854.
Patented Mar. 29, 1921.
2 SHEETS—SHEET 2.
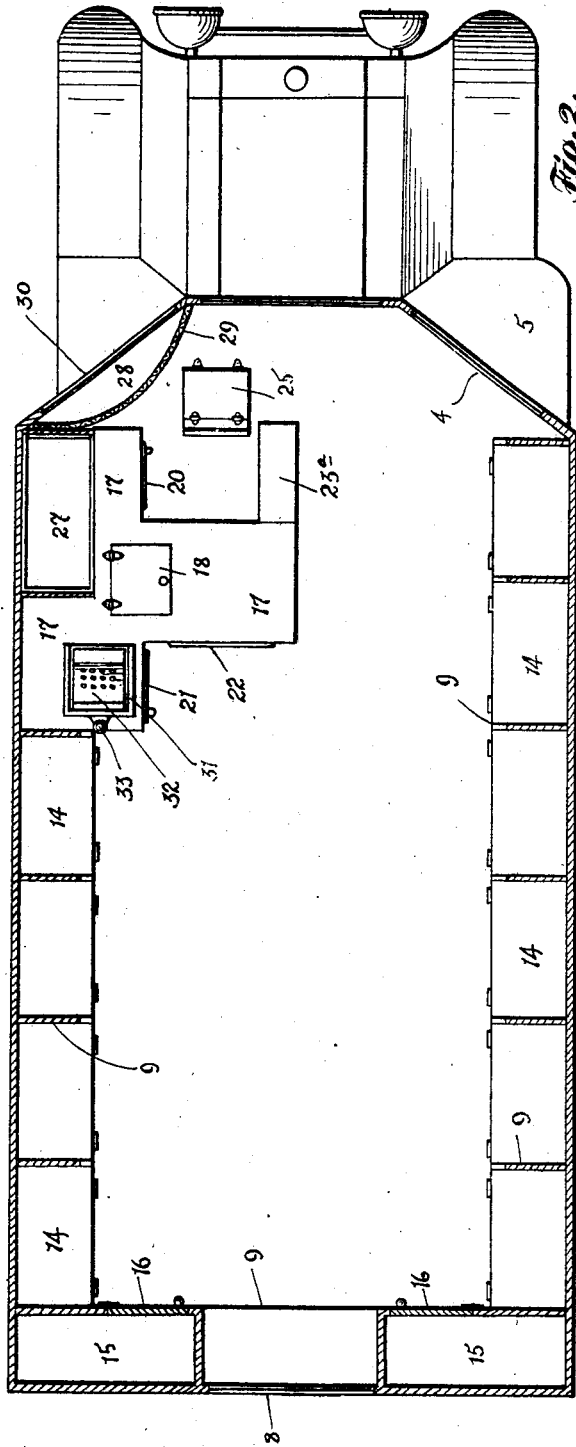
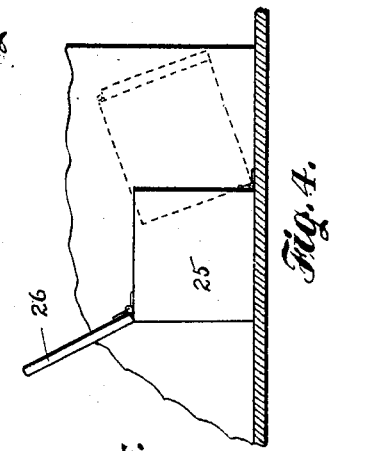
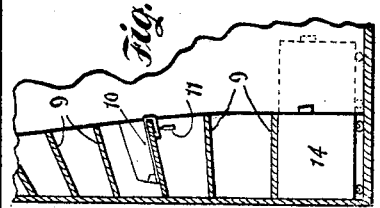
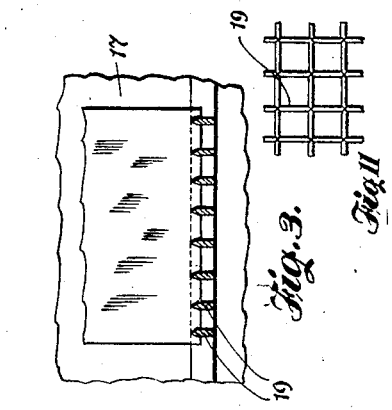
INVENTOR.
BY Herman A. Wieman.
John M. Spellman
ATTORNEYS.

UNITED STATES PATENT OFFICE.

HERMAN A. WIEMAN, OF DALLAS, TEXAS.

VEHICLE-BODY.

1,372,854.   Specification of Letters Patent.   Patented Mar. 29, 1921.

Application filed November 1, 1919. Serial No. 335,044.

*To all whom it may concern:*

Be it known that I, HERMAN A. WIEMAN, a citizen of the United States, residing at Dallas, in the county of Dallas and State of Texas, have invented certain new and useful Improvements in Vehicle-Bodies, of which the following is a specification.

My invention relates to new and useful improvements in vehicles for carrying groceries, vegetables and such like commodities and in such connection it may properly be termed a traveling store.

The primary object of my invention is to provide a vehicle adapted to transport groceries, fruits, meats, &c., from house to house and so arranged that the housewife or person desiring to purchase goods may enter the vehicle, inspect the merchandise and purchase whatever is desired, the articles for sale being suitably displayed the same as in an ordinary grocery store, market, etc.

Another object is to provide a vehicle of this description so constructed and arranged that all available space is economically utilized and which provides ample ventilation and protection from the elements.

Other objects and features will become apparent as the description of the invention prgresses, reference being had to the accompanying drawings forming part hereof, in which—

Figure 1 is a side elevational view of a vehicle embodying my invention, a portion of the wall broken away.

Fig. 2 is a longitudinal sectional view.

Fig. 3 is a detail view illustrating the manner of holding a block of ice in the cooler carried by the vehicle.

Fig. 4 is a detail view showing the arrangement of the folding seat for the driver.

Fig. 5 is a vertical sectional view of part of the shelving.

Figs. 6, 7, 8 and 9 are detail views, respectively, of a metallic division strip and price tag for attaching to the shelves.

Fig. 10 is a perspective view of a removable screened tray or receptacle for a portion of the shelving, and Fig. 11 is a top or plan view of a grating upon which ice is supported in position.

Referring more particularly to the drawings, 1 represents the body of the vehicle which as illustrated in Fig. 2 extends laterally beyond the front fenders of the engine, the body 1 having a box 2 over each rear wheel 3. Entrance and exit to and from the vehicle is by means of a door 4 set in the corner of the body underneath of which is a step 5, a continuation of the fenders, with suitable braces as indicated. The door 4 has a detachable sash 6 so that screen may be used in warm weather instead of glass. A ventilator 7 in the top of the body 1 of a suitable glass is also utilized as a skylight and may be raised as shown by the dotted lines. A window 8 in the rear of the body 1 has a screen, not shown, curved inward in the form of a semi-circle to allow the window to open inward without moving the screen.

In the interior of the body 1 is arranged shelving 9, see detail view Fig. 5, on each side and in the rear wall. This shelving has its supporting surface inclined toward the walls of the vehicle at varying angles, those at the top being more inclined than those at the bottom to retain the goods on the shelves as the vehicle strikes uneven places on the road, jar, etc., and each shelf has a division strip 10, see Figs. 6, 7, 8 and 9 which is placed at suitable distances apart on the shelves to properly separate the various commodities and also to serve as a price indicator, having a tag 11 detachably connected thereto. This division strip 10 is formed of two pieces of metal, a small portion 12 of each piece being lapped over its neighboring piece to hold them together. The division strip is bent over the edge of the shelf, the end 13 curved giving a spring effect. The price tags 11 have their ends hooked over a slot in the bent pieces of the strip.

Under each tier of shelves is arranged a drawer 14, supported on casters, which may be rolled out when desired, see Fig. 5.

In the rear end of the body 1 are arranged cabinets 15—15 with doors 16—16 into which is placed pastry, etc. An ice box or cooler 17 for meats and perishable articles is constructed in the form of a T in the front of the vehicle. This cooler has an opening 18 for inserting ice, meats, etc., the ice being supported on the grating 19, the bars of which have a sharp edge to keep the ice in a stable position. Doors 20 and 21 with glass panels also give access to the cooler, and the sides 22 and 23 are likewise of glass. A counter 23ª is adapted to fold down against the ice cooler, it being hinged in the manner illustrated in Fig. 1, the supporting strip 24 folding inward. A seat 25 for the driver or salesman has its front edge hinged to the floor of the vehicle body 1, the seat back 26 also hinged, so that the seat may be swung over out of the way when customers are being served—see dotted lines Fig. 4.

Arranged over one end of the T-shaped cooler is a tier of shelving in which are placed a removable receptacle or receptacles 27, see Fig. 10. These receptacles have their ends and front sides screened part way as illustrated to display the article for sale, for instance lettuce, their object of removal being to more easily clean the receptacles from moisture, dust, etc. A second tier of shelving 28 for fruit and such like is arranged in the corner of the body as shown in Fig. 2. The shelving 28 has a strip of wire mesh 29 across its front, with space enough to insert the hand. To the rear of the shelving 28 is a window 30. A shelf 31 containing a cash register 32 is supported to swing on a rod 33 attached to the facing of the shelf.

The vehicle or traveling store operates on designated routes at stated times of the day and is a great convenience to housewives and persons desiring fresh groceries, meats, fruits, &c., its practicability and usefulness having been satisfactorily demonstrated.

Having thus described the nature and objects of my invention, what I claim as new and desire to secure by Letters Patent is—

1. A vehicle body for transporting and dispensing groceries and the like comprising in combination with shelves, a substantially T-shaped ice box with one end disposed under the shelves and its opposite end projecting outward into the body of the vehicle the top of the ice box serving as a counter, a grid inside the box to prevent the ice from moving on the lurch of the vehicle, and a swinging pivoted frame to contain a cash register, said frame affixed to the shelving and arranged to be swung in under the shelving when not in use.

2. A vehicle for transporting and dispensing groceries and the like including a body, and a substantially T-shaped ice box having its head arranged to substantially abut a side of the vehicle body and having its leg spaced from the front end of the vehicle body, said ice box having a top formed to serve as a counter, and the space between the leg and the front end of the vehicle body providing room for the vehicle operator.

3. A vehicle for transporting and dispensing groceries and the like including a body, a substantially T-shaped ice box having its head arranged to substantially abut a side of the vehicle body and having its leg spaced from the front end of the vehicle body, said ice box having a top formed to serve as a counter, and the space between the leg and the front end of the vehicle body providing room for the vehicle operator, and a foldable counter member borne by the outer free end of the leg and extending toward the front end of the vehicle body.

4. A vehicle for transporting and dispensing groceries and the like including a body, an ice box having a top formed to serve as a counter, rows of shelving having adjacent ends terminating in spaced relation over the ice box top, and a swinging frame arranged to move into the said space between the ends of the rows of shelving.

In testimony whereof I have signed my name to this specification.

HERMAN A. WIEMAN.